United States Patent [19]

Johnson et al.

[11] Patent Number: 5,028,859
[45] Date of Patent: Jul. 2, 1991

[54] MULTIPLE BATTERY, MULTIPLE RATE BATTERY CHARGER

[75] Inventors: Robert M. Johnson, Lake Zurich; Joshua P. Kiem, Park Ridge, both of Ill.

[73] Assignee: Motorola, Inc., Schaumburg, Ill.

[21] Appl. No.: 361,534

[22] Filed: Jun. 5, 1989

[51] Int. Cl.$^5$ .................................................. H02J 7/00
[52] U.S. Cl. .......................................... 320/15; 320/2; 320/22
[58] Field of Search ..................... 320/2, 6, 15, 19, 20, 320/21, 22, 35, 39

[56] References Cited

U.S. PATENT DOCUMENTS

| | | | |
|---|---|---|---|
| 4,006,396 | 2/1977 | Bogut | 320/2 |
| 4,670,703 | 6/1987 | Williams | 320/22 |
| 4,673,861 | 6/1987 | Dubovsky | 320/2 |
| 4,684,870 | 8/1987 | George et al. | 320/20 |
| 4,686,444 | 8/1987 | Park | 320/31 |
| 4,727,306 | 2/1988 | Misak et al. | 320/35 |
| 4,742,290 | 5/1988 | Sutphin et al. | 320/21 |
| 4,755,733 | 7/1988 | Laliberte | 320/6 X |
| 4,766,361 | 8/1988 | Pusateri | 320/15 X |
| 4,792,743 | 12/1988 | Tsujino et al. | 320/15 |
| 4,816,735 | 3/1989 | Cook et al. | 320/15 X |
| 4,849,682 | 7/1989 | Bauer et al. | 320/15 |

FOREIGN PATENT DOCUMENTS 2399150  3/1979  France ................................. 320/15

OTHER PUBLICATIONS

Jasinski, "Chargers for Batteries with Auxiliary Cells", Motorola Technical Developments, vol. 8, Oct., 1988, pp. 107–108.
Radio Shack, 1988 Catalog No. 419, p. 150.

Primary Examiner—Steven L. Stephan
Assistant Examiner—Kristine Peckman
Attorney, Agent, or Firm—Raymond A. Jenski; Rolland R. Hackbart

[57] ABSTRACT

A multiple battery, multiple rate automatic switching battery charger is disclosed. Two or more batteries are charged sequentially in a multiple pocket battery chargers in order to maintain a low peak power consumption level. One battery pocket is assigned a priority so that a battery placed therein will be charged first at a fast rate of charge. Upon completion of the fast charge cycle, the priority battery can be trickle charged during the fast charge of the non-priority pocket battery.

22 Claims, 7 Drawing Sheets

MULTIPLE BATTERY, MULTIPLE RATE BATTERY CHARGER

BACKGROUND OF THE INVENTION

This invention relates generally to battery charging devices, and more particularly to a battery charger having the capability of charging at least two batteries at two independent charging rates while maintaining a low peak power consumption level.

Battery chargers which charge two or more rechargeable batteries at the same time are well known and commercially available. Additionally, batteries employing auxiliary cells which require a different charge level than the basic cells of the battery must employ a battery charger which charges the auxiliary cells separately at a separate rate of charge. (See Jasinski, "Chargers for Batteries with Auxiliary Cells", Motorola Technical Developments, Vol. 8, October 1988, pp. 107–8). Furthermore, charging batteries with battery chargers employing different charging rates has been disclosed in U.S. Pat. Nos. 4,006,396 and 4,727,306 and in U.S. patent application Ser. No. 341,778, "Method and Apparatus for Determining Battery Type and Modifying Operating Characteristics", filed on Apr. 21, 1989 in behalf of Johnson et al.

Each of the earlier battery chargers, however, simultaneously charge all batteries inserted into the charger at a high rate of charge. If size and weight are factors in the design of a battery charger, it would be desirable to reduce the volume of the charging circuitry while improving the efficiency. Also, if each battery were not simultaneously charged, it would be desirable to provide a priority of charging so that the user would know which battery would be charged first.

SUMMARY OF THE INVENTION

Therefore, it is one object of the present invention to reduce the size and weight of a battery charger.

It is another object of the present invention to reduce the peak power level required to charge two or more batteries by sequential charging of the batteries.

It is a further object of the present invention to prioritize the charging sequence and alert the user to which battery is charged first.

DETAILED DESCRIPTION OF THE PREFERRED EMBODIMENT

Figure 1:
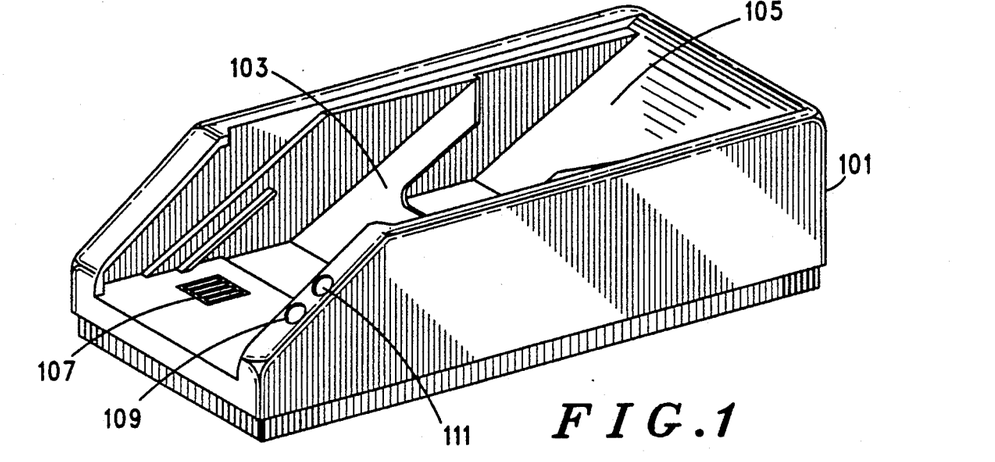
FIG. 1 is a perspective view of a dual pocket battery charger which may employ the present invention.

A multiple battery, multiple rate automatic switching fast battery charger which may employ the present invention is shown in perspective view in FIG. 1. The appearance of such an article is further shown in U.S. patent application Ser. No. 263,304, "Battery Charger or Similar Article", filed on Oct. 27, 1988 for Soren et al. In the shown implementation of the present invention, a housing 101 contains the electronic circuitry, microprocessor, and software necessary to charge two batteries (not shown) in a predetermined sequence and with a priority of charge sequence such that both batteries are optimally charged without the power drain associated with charging both batteries simultaneously.

In the shown implementation, two pockets 103 and 105 are located in the top surface of housing 101. One battery can be slid diagonally into pocket "A" 103 and a second battery can be diagonally slid into pocket "B" 105. Upon reaching the bottom of a pocket, the battery will contact a plurality of electrical contacts (for example, contacts 107 in pocket "A" 103), through which the battery may be sensed and charged.

Two bicolor light emitting diodes (LEDs) 109 and 111 are visible on a sloping front surface. LED 109 illuminates red when a battery having certain discharge characteristics is inserted in pocket "A" and is undergoing fast charging and illuminates green when the battery in pocket "A" is undergoing a slow charge rate. Similarly, LED 111 illuminates red when a battery in pocket "B" is undergoing fast charging and illuminates green when undergoing slow charging. The LED flashes red and green (which is perceived as yellow) when the battery in pocket "B" is waiting to be fast charged. It is an important feature of the present invention that the battery placed in pocket "A" 103 is given priority over a battery placed in pocket "B" 105 and the pocket "A" battery is charged first at a fast rate. The slow rate charge ("trickle charge") of pocket "A" battery occurs when the battery in pocket "A" has completed its fast charge cycle or is otherwise determined not to require fast charge. As used in the preferred embodiment a fast rate of charge is approximately 850 milliAmperes (mA) for a high capacity battery ("Hi-Cap") and approximately 440 mA for a small pack battery. A slow rate of charge is approximately 115 mA for a Hi-Cap battery and approximately 60 mA for a small pack battery.

In the preferred embodiment, the charger provides one hour charging using a wall mounted direct plug-in transformer unit to power the charger. This charger automatically switches rates of charge dependent upon which of two battery types are inserted in the charger. This charger fast rate charges one battery at a time to reduce the input power needed so that the wall mount direct plug-in transformer can be as small as possible and as easy to install as possible while meeting safety agency guidelines such as UL, CSA, and BABT. In order to achieve these requirements, the charger of the present invention automatically and sequentially charges the batteries, giving charge priority to the battery in the charge pocket "A". The charger has separate indication for each charge pocket and each indicates using red when fast charge is on and green when trickle charge is on and flashes yellow when the battery in the second charge pocket is waiting to be fast charged.

As mentioned previously, the charger of the present invention has charge pockets for two or more batteries. Each of these charge pockets has a full set of charge terminals (e.g. terminals 107 in FIG. 1). The preferred embodiment has two charge pockets and defines a full set of charge terminals as follows: Terminal 1 is negative or ground, Terminal 2 is thermistor sense, Terminal 3 is positive, Terminal 4 is "Hi-Cap positive". These terminals are described in more detail in association with FIG. 2, below. "Hi-Cap" refers to one type of battery which, in the preferred embodiment, yields 700 mAH.

Terminal 2 is used for a specific charge control in the preferred embodiment. In the preferred embodiment, the terminal is connected to a thermistor within the battery pack and the other end of the thermistor is connected to ground terminal 1. The thermistor is thermally coupled to the battery cells its resistance is used to detect the temperature of the battery cells. The charger uses this temperature information to determine whether the battery is too cold or too hot to fast rate charge. It also uses this temperature information to temperature compensate the fast rate voltage cutoff. Terminal 4 is used in the preferred embodiment to determine which type of battery is within the charge position. A battery type detector is discussed further in U.S. patent application Ser. No. 341,778, "Method and Apparatus for Determining Battery Type and Modifying Operating Characteristics" filed by Johnson et al. on Apr. 21, 1989.

The charger of the present invention charges either of two or more types of batteries in each of its charge positions. The preferred embodiment charges two different types of batteries which are either a 5 cell AA 700 mAH NiCad battery ("Hi-Cap") or a 5 cell 400 mAH NiCad battery (small pack). Other types of rechargeable batteries, including rechargeable Lithium and rechargeable Lead Acid may be recharged in the charger of the present invention with control of charge rates and other parameters exercised by the internal microprocessor.

Since each type of battery has different rates of charging and each battery can be charged at a fast rate, a trickle charge rate, and a zero rate, different input power requirements dependent upon the rates of charge exist. It is highly desirable to reduce the peak input power requirements to an acceptable level. In the preferred embodiment, the charger is for use indoors getting its power through a wall mounted transformer from a typical electrical outlet. The charger is meant to be small enough so that it takes up a minimum of desk top space. The desk top one hour charger used by previous radiotelephone equipment has a power transformer within the charger base housing. By moving this transformer to the wall, the desk top footprint of the charger is reduced.

Without the present invention, the input power requirements of the charger would exceed that of suitable wall mount direct plug-in transformer if two Hi-Cap batteries were simultaneously fast rate charged. The wall mount direct plug in transformer, in order to meet safety agency standards such as UL, CSA, and BABT, would either have to be floor mounted with a cord on either end or it would be large and heavy enough that it would need to be secured to the outlet plate by a screw, clip or similar means. This size is undesirable.

To resolve this difficulty, the present invention reduces the peak input requirements of the charger by sequentially fast rate charging the two (or more) batteries in its charge pockets. In the present invention, a battery which is in a "waiting state" waiting to be charged at a high rate may alternatively be trickle charged or not charged.

This invention gives fast rate charge priority to the battery in charge position "A". This means that whenever a battery is inserted into the pocket "A", fast rate charging is interrupted in the other charge pocket "B" and fast rate charging is begun in charge pocket "A". The charge pocket that was interrupted goes to either trickle or zero rate and the LED indication goes to a "waiting for fast charge" indication. Batteries that are inserted into charge pockets of lower priority than that being fast charged (even if they were not interrupted from fast charge) are given the waiting for fast charge indication. It should be noted that this invention is not limited to two charge pockets and more than one pocket with lower priority may exist. The lower priority charge pockets may, at the option of the designer, have equal priority so that fast charging among themselves is not interrupted as it is when a battery is inserted into the priority pocket. Alternatively, there may be other priority systems among these pockets.

The invention uses a waiting for fast charge indication to tell the user that the state of charge is not known and the user should use the battery accordingly. In the preferred embodiment, a flashing yellow (alternate red and green) indicates the waiting for fast charge indication. A continuous red indicates to the user that the battery in the associated pocket has not been fully charged and is currently undergoing a fast charge. If the charger has finished the fast charge cycle, it goes to either trickle or zero rate and indicates green. Green indicates that the battery in the associated pocket has been fully charged.

Figure 2:
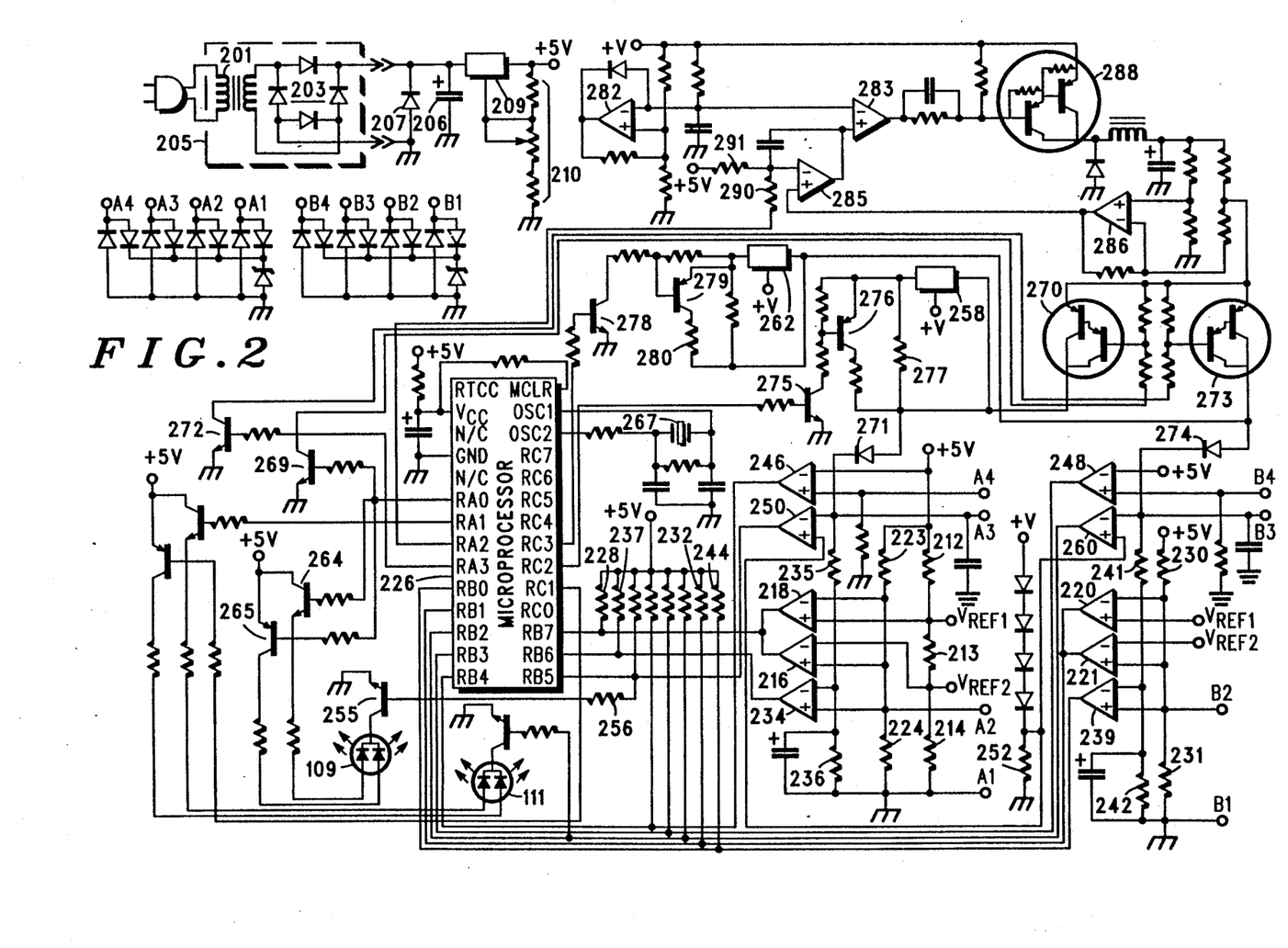
FIG. 2 is a schematic diagram of a dual battery, dual charging rate battery charger employing the present invention.

Referring now to the schematic of FIG. 2, the input power of the charger is supplied by a wall mount direct plug in transformer which contains a transformer 201 and a full wave bridge rectifier (203) within its case 205. The output enters the charger and is filtered by capacitor 206 to provide DC power for the unit and is distributed to all points of the charger as designated by a circled plus sign. Diode 207 is used to provide transient protection at the input of the charger.

Regulator 209 and resistor network 210 are used to regulate the input DC voltage and adjust the voltage to 5 volts. This regulated 5 volts is distributed to all points of the schematic as designated by +5 V.

Batteries can be inserted into charge pockets designated by "A" and "B" respectively. Charge pocket terminals are designated by B1, B2, B3, and B4 meaning B charge pocket terminals 1 through 4 and likewise for the A charge pocket. When a battery is inserted into a charge pocket, it is connected to all designated points in the schematic labeled by the charging terminals. Charge pocket terminals A and B are electrostatic discharge protected by diodes and zener diodes.

Resistors 212, 213, and 214 form a resistor divider which give two reference voltages VREF1 and VREF2 for use by conventional comparators 216, 218, 220, and 221.

When a battery is in charge pocket A, resistors 223 and 224 form a resistor divider along with the previously described thermistor disposed within the battery across terminals A2 and A1 (not shown in the diagram of the charger). The divided down voltage drives comparators 216 and 218. When the battery is cold (below 10° C.) the resistance of the battery thermistor is high enough so that the divided down voltage exceeds the reference voltage VREF1. This causes comparator 218 to bring its output to a logic low. Likewise, when the battery is hot (above 40° C.) the resistance of the battery thermistor is low enough so that the divided down voltage is less than the reference voltage VREF2. This causes comparator 216 to bring its output to a logic low. The outputs of these two comparators are hardware OR-ed and microprocessor 226 at input pin RB7 is driven with this logic low. (In the preferred embodiment, microprocessor 226 is a PIC16C55 manufactured by Microchip, Inc. but may be any suitable microprocessor). When the battery is within the 10° C. to 40° C. window, the thermistor value is such that comparators 216 and 218 do not produce a logic low and, because of pull up resistor 228, a logic high is delivered to microprocessor 226 at input pin RB7.

When a battery is in charge pocket B, resistors 230 and 231 along with battery thermistor across terminals B2 and B1 form a resistor divider. The divided down voltage drives comparators 220 and 221. When the battery is cold (below 10° C.) the resistance of the battery thermistor is high enough so that the divided down voltage exceeds the reference voltage VREF1. This causes comparator 220 to bring its output to a logic low. Likewise, when the battery is hot (above 40° C.) the resistance of the battery thermistor is low enough so that the divided down voltage is less than the reference voltage VREF2. This causes comparator 221 to bring its output to a logic low. The outputs of these two comparators are hardware OR-ed and microprocessor 226 at input pin RB1 is driven with this logic low. When the battery is between 10° C. and 40° C., the thermistor value is such that comparators 220 and 221 do not produce a logic low and because of pull up resistor 232, a logic high is delivered to microprocessor 226 at input pin RB1.

The resistor divider formed by resistors 223, 224 and the battery thermistor across terminals A2 and A1 also drives conventional comparator 234. The battery voltage across terminal A3 and A1 is divided down by resistors 235 and 236 and this output drives comparator 234. These two voltages are compared and, if the divided down battery voltage exceeds the output of the other divider, then comparator 234 produces a logic low at its output which drives microprocessor 226 input pin RB6. If the divided down battery voltage is less than the output of the other divider, then comparator 234 does not produce a logic low and because of pull up resistor 237, a logic high is delivered to microprocessor 226 at input pin RB6. This is the TCVCO (Temperature Compensated Voltage Cut Off) for charge pocket A. It is temperature compensated by the thermistor since the thermistor's resistance changes the divided down voltage as the temperature of the battery cells varies.

The resistor divider formed by resistors 230, 231 and the battery thermistor across terminals B2 and B1 also drives conventional comparator 239. The battery voltage across terminal B3 and B1 is divided down by resistors 241 and 242 and this output drives comparator 239. These two voltages are compared and, if the divided down battery voltage exceeds the output of the other divider, then comparator 239 produces a logic low at its output which drives microprocessor 226 input pin RB0. If the divided down battery voltage is less than the output of the other divider, then comparator 239 does not produce a logic low and because of pull up resistor 244, a logic high is delivered to microprocessor 226 at input pin RB0. This is the TCVCO for charge pocket B. It is temperature compensated by the thermistor since the thermistor's resistance changes the divided down voltage as the temperature of the battery cells varies.

Hi-Cap positive terminal A4 drives the non-inverting input of a conventional comparator 246 with a pull down resistor to ground also on this input line. Since the pull down resistor (when a large capacity Hi-Cap battery is not in the charge position) keeps the voltage in the non-inverting input of comparator 246 below the 5 volts on the inverting input of comparator 246 the output is kept to a logic low. When a "Hi-Cap" battery is present in charge pocket A, it will deliver over 5 volts to the non-inverting input and the output will allow a pull up resistor to deliver a logic high to microprocessor 226 input RB4. The detection of a Hi-Cap battery will not be made if the battery is deep discharged upon insertion into the charge pocket but after a few seconds of charge, the voltage will be driven up above 5 volts.

In a similar fashion, Hi-Cap positive terminal B4 drives the non-inverting input of a conventional comparator 248 with a pull down resistor.

Positive terminal A3 drives the inverting input of a conventional comparator 250. The non-inverting input is driven by a voltage given by the filtered input DC voltage minus four diode drops. Resistor 252 is used to turn on these four diodes. This voltage which drives the non-inverting input is approximately 9 volts when supplied with a 12 Volt input voltage. The battery voltage is typically no more than 7.7 volts under charge so the output of comparator 250 becomes a logic high from a pull up resistor. This output drives microprocessor 226 input RB5. The output also enables the bicolor light emitting diode (LED) 109 to be lit by turning on transistor 255 through applying base current through resistor 256. When the battery is not present in the "A" charge pocket, then the inverting input sees a voltage greater than that driving the non-inverting input of comparator 250 and the output becomes a logic low. This high voltage at the inverting input is created by using conventional regulator 258 in current source mode (by placing a resistor between the output and adjust terminals) and with the filtered input voltage at its input. Since there is no place for the current from the current source to go, the output voltage of regulator 258 goes as close to its input voltage as it can. This voltage is reduced by a diode drop and drives the inverting input of comparator 250. The logic low now turns off transistor 255 and bicolor LED 109 is disabled from being lit. Microprocessor 226 input RB5 now sees a logic low.

Similarly, positive terminal B3 drives the inverting input of conventional comparator 260. The non-inverting input is driven by a voltage given by the filtered input DC voltage minus four diode drops. The output of comparator 260 becomes a logic high from a pull up resistor. This output drives microprocessor 226 input RB2 and enables the bicolor LED 111. When the battery is not present in the "B" charge pocket, the inverting input sees a voltage greater than that driving the non-inverting input of comparator 260 and the output becomes a logic low. This high voltage at the inverting input is created by using regulator 262 in current source mode and drives the inverting input of comparator 260. The logic low turns off and bicolor LED 111.

Bicolor LED 109 is a 3 leaded part, such as a LD1007 available from Siemens, Inc., with a common lead, a red lead and a green lead. The Red LED is turned on via transistor 264 which is activated when microprocessor 226 output RA0 is a logic high. The Green LED is turned on via transistor 265 when RA0 is a logic low. Since a single output controls both red and green, they cannot be both on at the same time and transistor 255 disables LED 109 when a battery is not in the charge pocket.

Bicolor Led 111 is similar to LED 109. The Red LED is turned on when microprocessor 226 output RA1 is a logic high. The Green LED is turned on when microprocessor 226 output RC1 is a logic low. The two LEDs are operated independently by the two microprocessor outputs.

The microprocessor 226 is driven with a clock signal which is created by resonator 267 and associated circuit elements. These elements are connected across microprocessor 226 terminals OSC1 and OSC2 and are used to create a stable clock signal. The microprocessor 226 also sets the control signal MCLR and to power and filter the microprocessor 226 supply input VCC.

| STATE | FAST IN A | FAST IN B | SLOW IN A | SLOW IN B | WAIT IN B |
|---|---|---|---|---|---|
| A | NO | NO | NO | NO | NO |
| B | YES | NO | NO | NO | NO |
| C | NO | NO | YES | NO | NO |
| D | NO | NO | NO | YES | NO |
| E | NO | YES | NO | NO | NO |
| F | YES | NO | NO | NO | YES |
| G | YES | NO | NO | YES | NO |
| H | NO | YES | YES | NO | NO |
| I | NO | NO | YES | YES | NO |

Microprocessor 226 output RA0 not only turns on the green or red LEDs but also turns on transistor 269 when it is a logic high. Transistor 269 then turns on darlington transistor 270. When transistor 270 is on, fast charge current flows into the battery in the charge pocket "A" through diode 271. When microprocessor 226 output RA0 is low, fast charge current is disabled to charge pocket "A".

When microprocessor 226 output RA3 is a logic high, it turns on transistor 273. When transistor 273 is on, fast charge current flows into the battery in the "B" charge pocket through diode 274. The microprocessor 226 logic is such that both transistor 270 and transistor 273 are not on at the same time. Microprocessor 226 output RA3 does not control LEDs as RA0 does.

When a battery is in charge pocket "A", regulator 258 (used in a current source configuration) has a path into which the current can flow (through diode 271 and then into the battery being charged through terminal A3). The battery is slow charged automatically without microprocessor control at the rate proper for the small pack battery. The charge rate is boosted to the rate proper for the Hi-Cap battery when a logic high at microprocessor 226 output RC2 turns on transistor 275 and transistor 276. Transistor 275 is used for current gain so that transistor 276 is driven into saturation and resistor 277 is used to set current boost. When the battery is being fast charged in "A", the slow charge current is added to the fast charge current.

A similar process occurs when a battery is being charged in the "B" pocket. Regulator 262 provides slow charge current via terminal B3. The rate is boosted to that proper for the Hi-Cap battery when a logic high at microprocessor 226 output RC3 turns on transistor 278 and 279 to provide current boost through resistor 280.

A current mode switching supply is formed by comparators 282, 283, operational amplifiers 285, 286, transistor 288 and associated circuitry. The fast charge current comes from this supply through transistors 270 or 273. The rate of the fast charge current is set by microprocessor 226 output RA2. When it is a logic high, the voltage at the inverting terminal of operational amplifier 285 is not divided down through resistors 290 and 291 as it would be if output RA2 were a logic low. Thus, the switching supply of the present invention may change the fast charge current to one of the two levels used in the charger.

Referring now to FIG. 3, a flowchart of the process exercised by microprocessor 226 in the establishment of priority and charge rate for the dual battery dual charge rate charger is shown. This figure is separated into nine different pieces. Each piece is connected through "GOTO's" where appropriate. Each of these is for a different state of the charger. These different states and the section of the flow diagram to which they refer is given below.

Figure 3A:
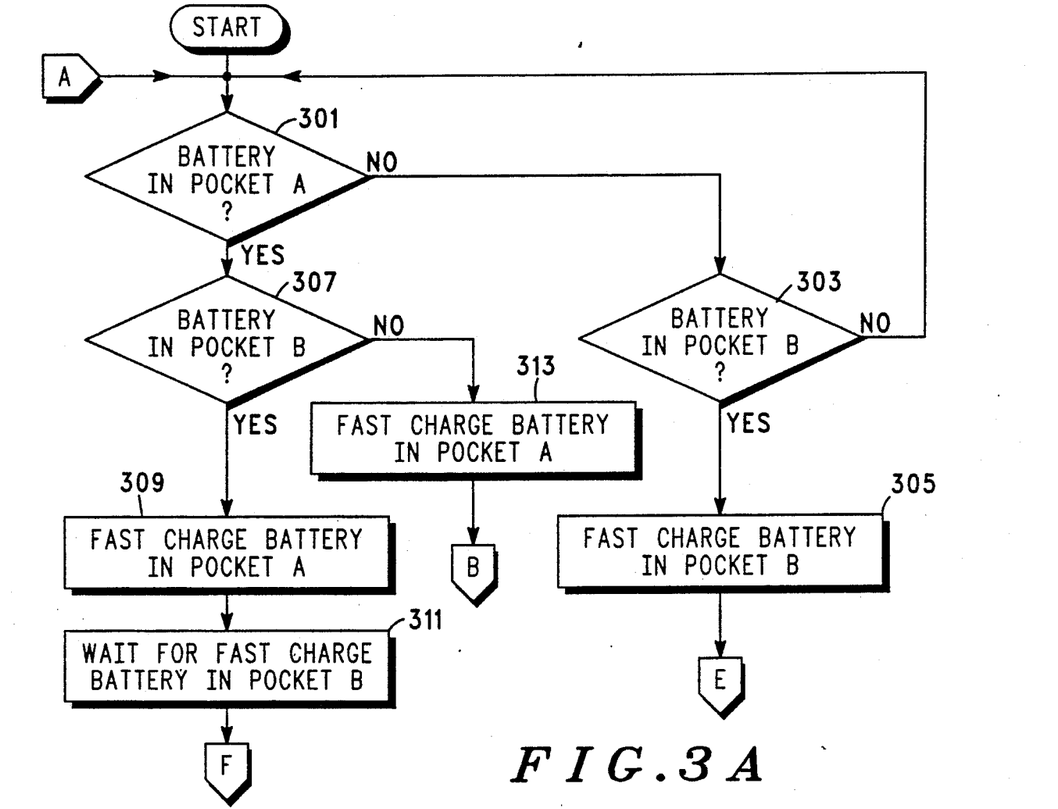
FIGS. 3A through 3I, together, is a flowchart of the process employed by the present invention.
Figures 3B, 3D:
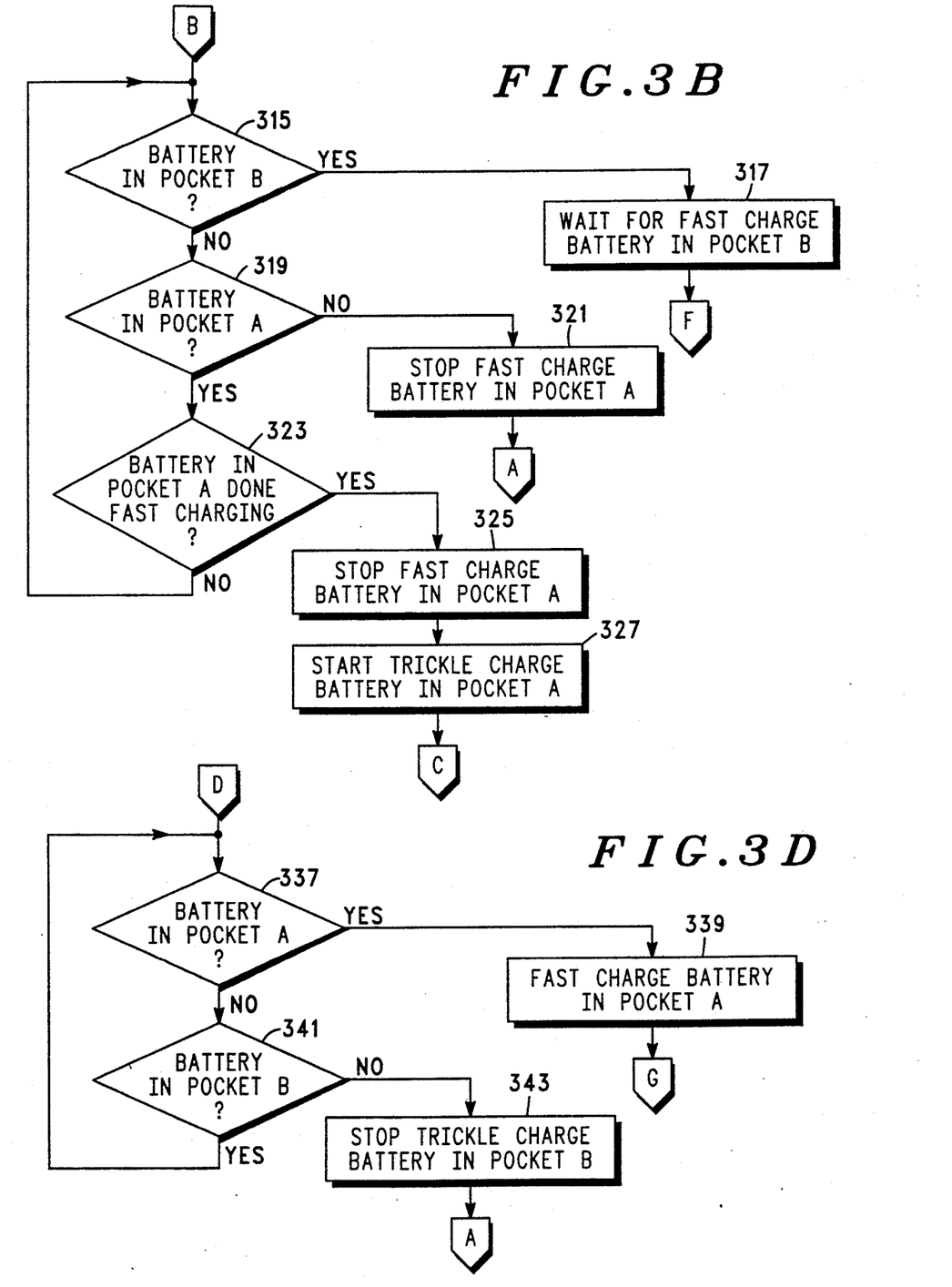
Figure 3C:
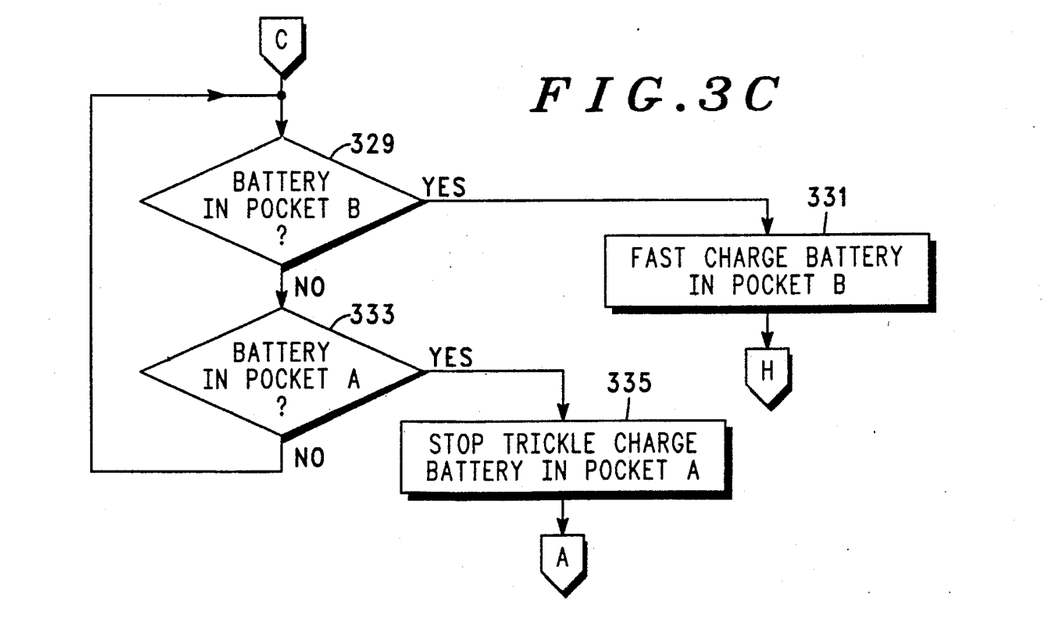
Figure 3E:
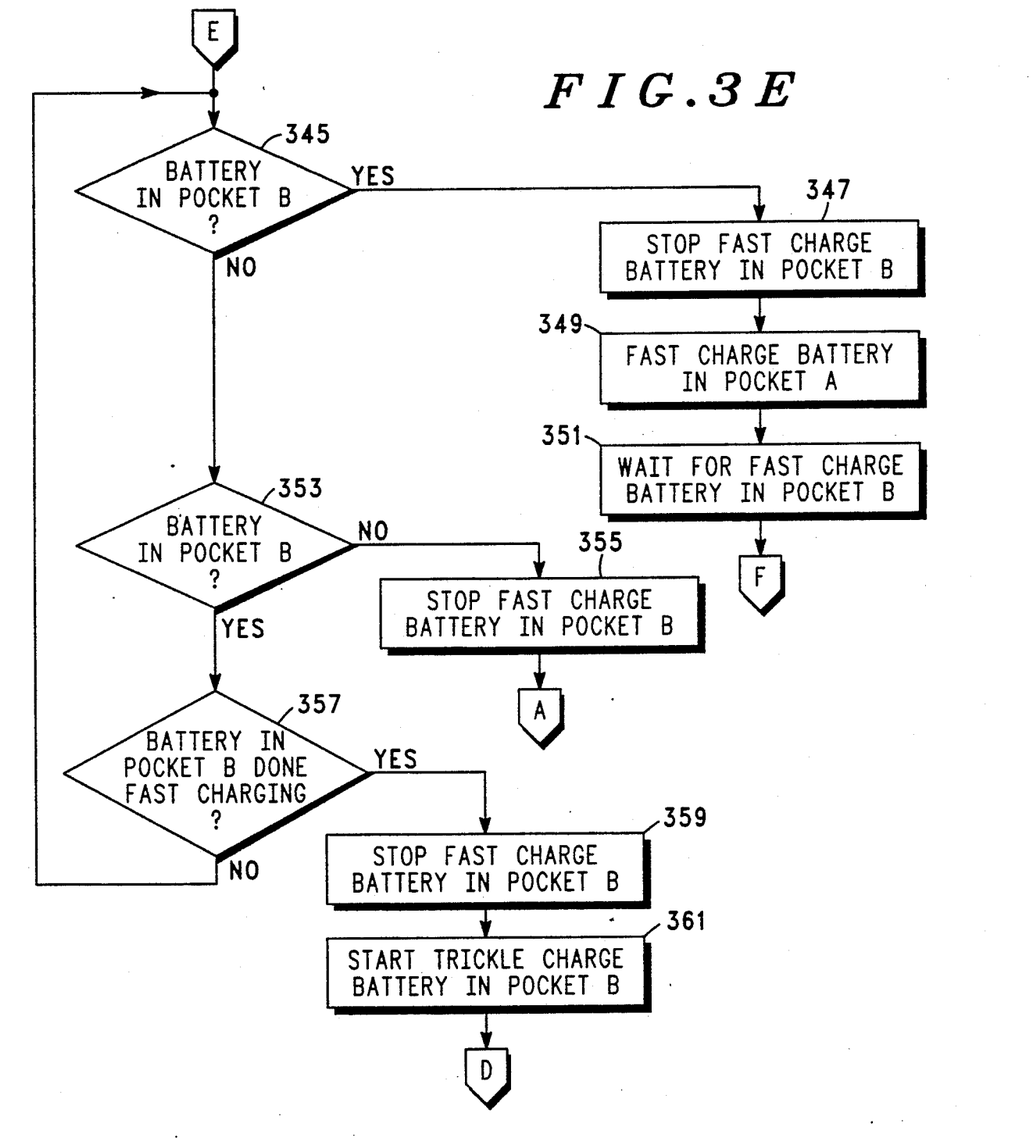
Figure 3F:
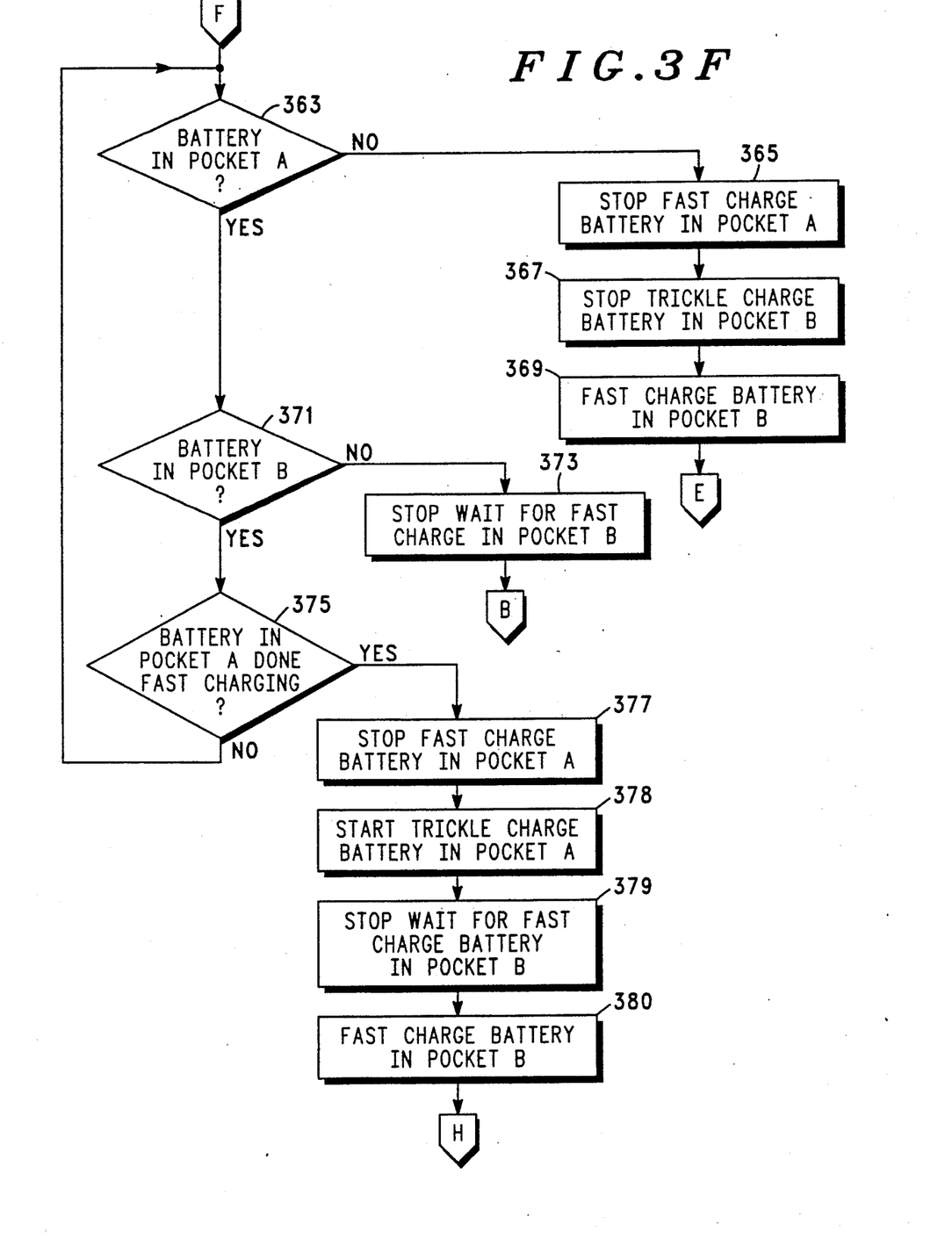

In the flowchart, the letters A through I denote states of the charger State A is where there are no batteries in the charger, so pockets "A" and "B" are empty. State B is where there is no battery in the charge pocket "B" and the battery in charge pocket "A" is at fast rate. State C is where the battery is present in Pocket "A" and it is being trickle charged and where there is no battery in charge pocket "B". State D is where there is no battery in charge pocket "A" and the battery in charge pocket "B" is trickle charging. State E is where there is no battery in pocket "A" and the battery in pocket "B" is fast charging. State F is where battery in charge pocket "A" is fast charging and the battery is in pocket "B" is in the wait stage where it is waiting for its turn to fast charge. State G is where a battery in charge position "A" is fast charging and battery in charge pocket "B" is trickle charging. State H is where a battery in pocket "A" is trickle charging and a battery in pocket "B" is fast charging.. State I is where batteries in both pocket "A" and pocket "B" are trickle charging. Referring now to FIG. 3A where the process of sequential charging and battery prioritization is controlled, a determination is made, at 301, whether a battery has been placed in pocket "A". If the indication is no, a determination is made, at 303, whether a battery has been placed in pocket "B". If a battery is not in position "B" either, a loop is created to await the placement of a battery in the charger. If a battery is in pocket "B" but not in pocket "A", as determined at 303, the fast charge current is supplied to the battery in position "B", at 305, and the process moves to State E (FIG. 3E). If a battery is in pocket "A" (determined at 301 of FIG. 3A), the process looks to see if there is a battery in pocket B, at block 307. If there is, the process proceeds to start fast charging the battery in pocket "A" (309) it places then the battery in pocket "B" into the wait state (311) and then it goes to state F. If after finding a battery in pocket "A" it is found that there is no battery in pocket "B", the process branches to block 313 which starts fast charging the battery in pocket "A" and then proceeds to state B. State B is where the battery in pocket "A" is fast charging and there is no battery in charge pocket "B".

In State B the process proceeds to decision block 315, which finds out whether there is a battery now present in pocket "B". If yes, the process branches over and places the battery in pocket "B" in the wait state, at 317, since the battery is being fast charged in charge pocket "A" and proceeds to state F. Returning to block 315, if a battery is still not present in pocket "B" then the process proceeds to find out whether there is still battery in pocket "A" at block 319. If there is no battery found at 319, the process will stop fast charging in charge pocket "A" at block 321 and return to state A where no batteries are present in the charger. Returning to block 319, if there is still a battery present in pocket "A", the process proceeds to check if the battery in position is done fast charging, at decision block 323. If it is not done fast charging, then the process proceeds to 315. If the battery in pocket "A" is done fast charging, as determined by its charge control, the fast charging is stopped in pocket "A" and trickle charging commences in pocket "A", in blocks 325 and 327 respectively. The process then proceeds to State C.

In state C the battery in pocket "A" is being trickle charged and there is no battery in pocket "B". This state is shown in FIG. 3C. The process checks to see if there is a battery now in pocket "B" at block 329. If there is a battery in pocket "B" the process starts fast charging that battery, at block 331, and subsequently proceeds to state H, which is fast charging in pocket "B", trickling in pocket "A". Going back to decision block 329, if there is no battery in pocket "B", then the process proceeds to check to see if there is a battery in pocket "A", at 333. If there is a battery in pocket "A", at 335, the process loops back to state C and continues in that loop. If there is no battery in pocket "A", the process stops trickling the battery in pocket "A", at 335, and proceeds to state A, state A being no batteries in the charger.

In FIG. 3D state D is shown where there is no battery in pocket "A" and a battery in pocket "B" is being trickle charged. This state is basically the same state as C except the state of each of the charging pockets is transposed. The process proceeds to decision block 337 where a check is made to determine if there is a battery in pocket "A". If there is a battery in pocket "A", a branch to start fast charging that battery in pocket "A" (block 339) is made and the process proceeds to state G (fast charge in pocket "A" and trickle in pocket "B"). If there is no battery in pocket "A" the process continues to decision block 341 where a determination is made whether the battery is still in pocket "B". If it is still in pocket "B" the process loops back to decision block 337. If the battery is removed from pocket "B", the process stops trickle charging in that pocket, block 343, and proceeds to state A (no batteries in the charger).

Proceeding to state E in FIG. 3E, which is no battery in pocket "A" and fast charging the battery in pocket "B", the first decision block determines if there is a battery in pocket "A", at 345. If there is a battery in pocket "A" fast charging is stopped in pocket "B", at 347, and fast charging is started in pocket "A", at 349. The battery in pocket "B" is placed in wait state, at 351, and the process proceeds to state F (fast charging in pocket "A" and waiting for fast charge in pocket "B"). Going back to decision block 345, if there is no battery in pocket "A" the process proceeds to the next decision block 353. If there is no longer a battery in pocket "B" the process stops fast charging that battery, at 355, and proceeds to state A. If there is a battery in pocket "B", the process proceeds to the next decision block 357 where a check is made to see if fast charging has been completed in pocket "B". If that battery is not done fast charging, the process loops back to block 345 and continues in the loop. From decision block 357 if the battery is done fast charging, the process stops fast charging in pocket "B", at 359, and starts trickle charging in pocket "B" at block 361, and proceeds to state D.

State F, shown in FIG. 3F, is where a battery in pocket "A" is fast charging and a battery in pocket "B" is in wait state. Going to the first decision block 363, the process checks to see whether the battery is still present in pocket "A", if it is not present the process stops fast charging in pocket "A", at 365, stops trickle charging in pocket "B", at 367, and starts fast charging in pocket "B", at 369. The process then proceeds to state E. Going back to decision block 363, if the battery is still in pocket "A", the process checks to see if a battery is in pocket "B", at 371. If it is not present, the process stops waiting for fast charge, at 373, and proceeds to state B. Going back to decision block 371, if there is a battery present in pocket "B" the process proceeds to determine if the battery in pocket "A" is done fast charging, at block 375. If it is not done fast charging, a loop back to decision block 363 is accomplished. From decision block 375 if there is a battery present, or if battery in pocket "A" is done fast charging, the process stops fast charging in pocket "A", at block 377, starts trickle charging in that pocket at block 378, stops waiting in pocket, "B", at block 379, and starts fast charging in pocket "B", at block 380. The process then proceeds to state H. (fast charge in pocket "B" and trickle charge in pocket "A").

Figure 3G:
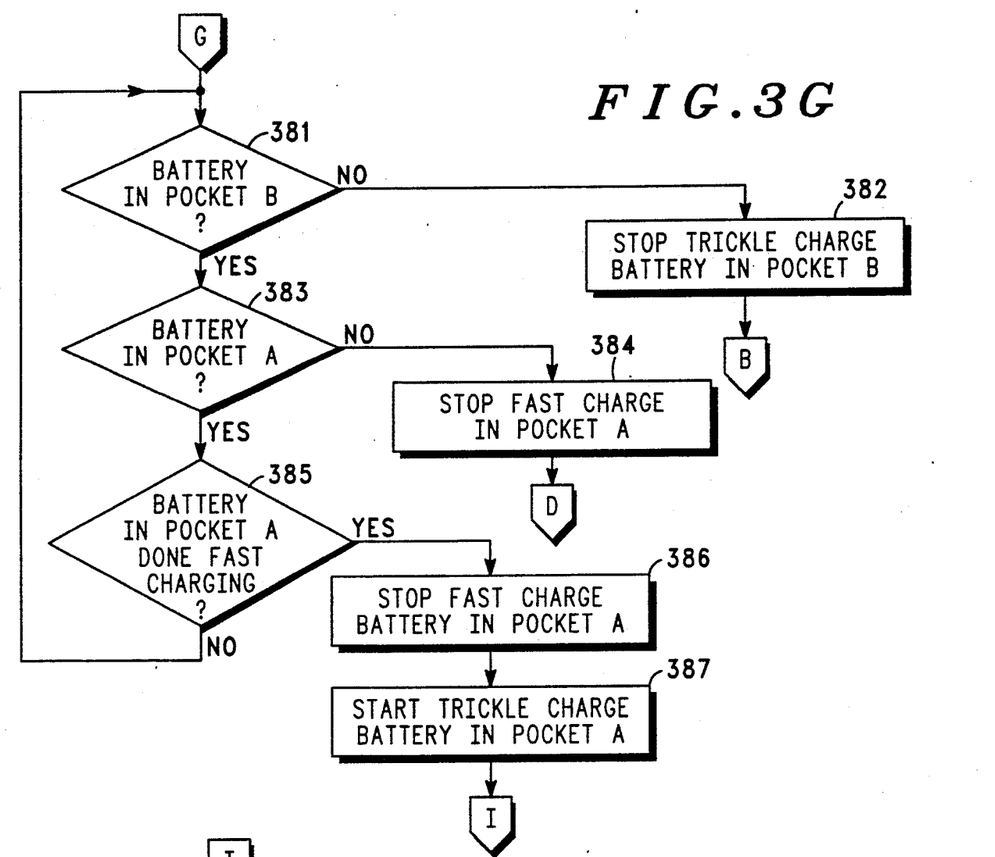

State G is shown in FIG. 3G and illustrates the process of trickle charging in pocket "B" and fast charging in pocket "A". The first decision is to determine whether there is a battery in pocket "B" or not (at block 381). If not, then the process stops trickle charging in pocket "B", at block 382, and proceeds to state B. If, however, there is a battery in pocket "B", then a check if there is a battery in pocket "A" occurs at decision block 383. If there is no battery at pocket "A", fast charging is stopped in pocket "A", at block 384, and the process proceeds to state D. If there is a battery in pocket "A", the process determines if the battery in pocket "A" is done fast charging, at block 385. If it is not done fast charging, a loopback to block 381 is accomplished. If it is done fast charging, fast charging is stopped in pocket "A", at 386 and trickle charging is started in pocket "A", at 387, and proceeds to state I (both pockets "A" and "B" are trickle charging).

Figure 3H:
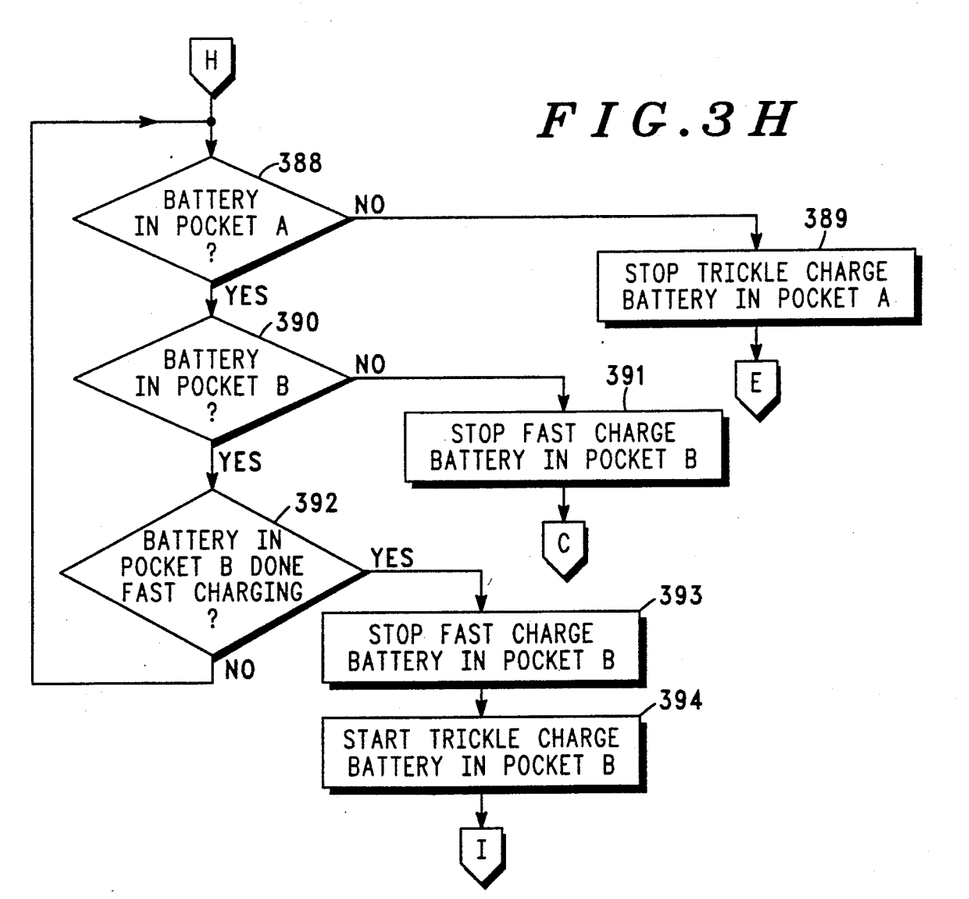

Considering now state H in FIG. 3H, where a battery in pocket "A" is in trickle charge and a battery in pocket "B" is in fast charge, a determination is made whether a battery is in pocket "A", at block 388. If there is none, then trickle charging in pocket B is stopped, at block 389, and the process proceeds to state E. If there is a battery in pocket "A" a determination is made whether there is a battery in pocket "B", 390 at. If there is no battery in pocket "B", the process stops fast charging in that pocket, at 391, and proceeds to state C. Proceeding from block 390, if there is a battery in pocket "B" the process then checks to see if that battery is done fast charging, at 392. If it is not done fast charging, then a loopback to decision block 388 occurs and the loop continues. If it is done fast charging, then fast charging is stopped in pocket "B", at 393, trickle charging is started in that pocket, at 394, and the process proceeds to state I (trickle charge in both pockets "A" and "B").

Figure 3I:
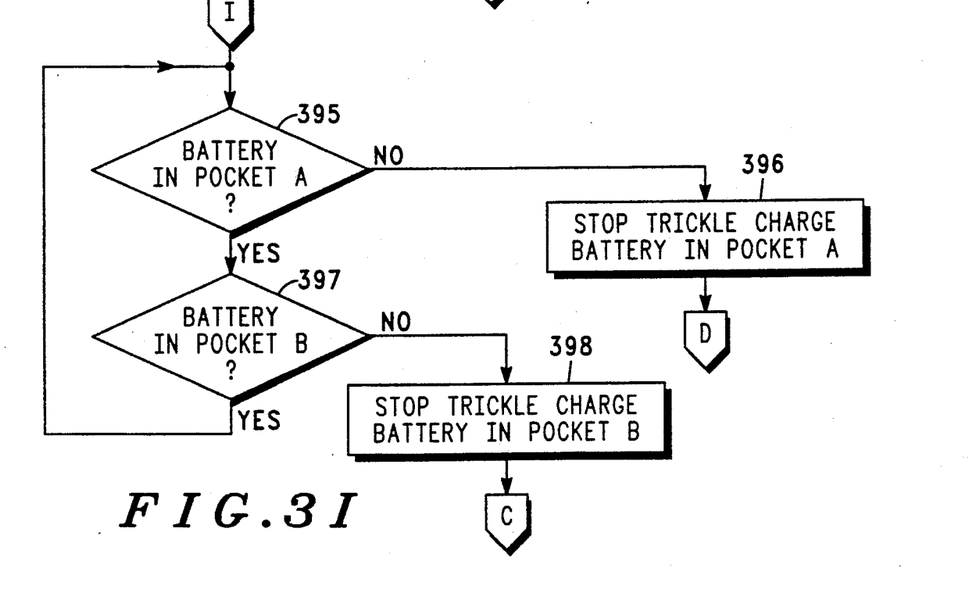

In state I, shown in FIG. 3I, process the determines if there is a battery in pocket "A", at 395. If there is no battery in pocket "A", the process stops trickle charging in pocket "A" at block 396, and proceeds to state D. If there is a battery present in pocket "A", a determination is made if there is a battery in pocket "B", at 397. If it is present in pocket "B", then the process loops back to block 395 and remains in this loop until one of the batteries is removed. If there is not a battery present in pocket "B", then the process stops trickle charging in that pocket, at 398, and proceeds to state C.

Thus, a multiple battery, multiple charge rate battery charger has been shown and described. In order to reduce size and weight, sequential charging of two or more batteries reduces the volume necessary for the charging circuitry. The power transformer for the AC mains may be realized as a conventional wall mount plug-in transformer. Since the batteries are sequentially charged, a priority is assigned to one battery pocket in the charger in favor of another such that the user will know which battery is charged first. Upon the priority battery being fast charged to a sufficient charge level, the secondary priority battery is coupled to the fast charging circuit while the sufficiently charged priority battery is trickle charged to its total capacity. When the second priority battery has fast charged to a sufficient level, it too is switched to a trickle charge mode. Priority is always afforded the priority battery pocket and it is this battery which is fast charged first.

We claim:

1. A battery charger for charging at least two rechargeable batteries, comprising:
   first means for receiving a first battery and second means for receiving a second battery;
   interruptible means for supplying a first charging current to said first battery when said first battery is disposed in said first means for receiving;
   means for detecting the presence of said second battery in said second means for receiving; and
   means, responsive to said means for detecting the presence of said second battery, for supplying a second charging current to said second battery and for interrupting said first charging current while said second charging current is being supplied.

2. A battery charger in accordance with claim 1 further comprising means for supplying to said first battery a third charging current having a smaller magnitude than said first charging current.

3. A battery charger in accordance with claim 2 wherein said means for interrupting said first charging current further comprises means for simultaneously charging said first battery with said third charging current and said second battery with said second charging current until said second battery has completed charging with said second charging current and means for reconnecting said means for supplying said first charging current to said first battery when said second battery has completed charging with said second charging current.

4. A battery charger in accordance with claim 3 further comprising means for simultaneously supplying to said second battery a fourth charging current having a smaller magnitude than said second charging current and supplying said first charging current to said first battery after said second battery has completed charging with said second charging current.

5. A battery charger in accordance with claim 3 further comprising means for providing a user perceptible indication of which battery is being charged and whether said first battery is being charged with said first charging current or said third charging current.

6. A battery charger in accordance with claim 1 further comprising means for supplying to said second battery a fourth charging current having a smaller magnitude than said second charging current.

7. A battery charger in accordance with claim 6 wherein said means for interrupting said first charging current further comprises means for reconnecting said means for supplying said first charging current to said first battery when said second battery has completed charging with said second charging current and means for supplying said second battery with said fourth charging current simultaneous with said supplying said first charging current.

8. A battery charger in accordance with claim 7 further comprising means for providing a user perceptible indication of which battery is being charged and whether said second battery is being charged with said second charging current or said fourth charging current.

9. A battery charger in accordance with claim 1 wherein said means for interrupting said first charging current further comprises means for placing said interruptible means in a waiting state until said second battery has completed charging with said second charging current and means for reconnecting said means for supplying said first charging current to said first battery when said second battery has completed charging with said second charging current.

10. A battery charger in accordance with claim 9 further comprising means for providing a user perceptible indication of which battery is being charged and whether said first battery is being charged with said first charging current or is in a waiting state.

11. A battery charger in accordance with claim 1 further comprising means for providing a user perceptible indication of which battery is being charged.

12. A method of charging at least two batteries, comprising the steps of:
    receiving a first battery in a first charging pocket;
    interruptibly supplying a first charging current to said first battery;
    receiving a second battery in a second charging pocket;
    detecting the presence of said second battery in said second charging pocket; and
    supplying a second charging current to said second battery and interrupting said first charging current while said second charging current is being supplied in response to said detection of the presence of said second battery.

13. A method in accordance with the method of claim 12 further comprising the step of supplying to said first battery a third charging current having a smaller magnitude than said first charging current.

14. A method in accordance with the method of claim 13 wherein said step of interrupting said first charging current further comprises the steps of simultaneously charging said first battery with said third charging current and said second battery with said second charging current until said second battery has completed charging with said second charging current and reconnecting said means for supplying said first charging current to said first battery when said second battery has completed charging with said second charging current.

15. A method in accordance with the method of claim 14 further comprising the step of simultaneously supplying to said second battery a fourth charging current having a smaller magnitude than said second charging current and supplying said first charging current to said first battery after said second battery has completed charging with said second charging current.

16. A method in accordance with the method of claim 14 further comprising the step of providing a user perceptible indication of which battery is being charged and whether said first battery is being charged with said first charging current or said third charging current.

17. A method in accordance with the method of claim 12 further comprising the step of supplying to said second battery a fourth charging current having a smaller magnitude than said second charging current.

18. A method in accordance with the method of claim 17 wherein said step of interrupting said first charging current further comprises the steps of reconnecting said first charging current to said first battery when said second battery has completed charging with said second charging current and supplying said second battery with said fourth charging current simultaneously with said supplying said first charging current.

19. A method in accordance with the method of claim 18 further comprising the step of providing a user perceptible indication of which battery is being charged and whether said second battery is being charged with said second charging current or said fourth charging current.

20. A method in accordance with the method of claim 12 wherein said step of interrupting said first charging current further comprises the steps of placing said interruptible means in a waiting state until said second battery has completed charging with said second charging current and reconnecting said means for supplying said first charging current to said first battery when said second battery has completed charging with said second charging current.

21. A method in accordance with the method of claim of 20 further comprising the step of providing a user perceptible indication of which battery is being charged and whether said first battery is being charged with said first charging current or is in a waiting state.

22. A method in accordance with the method of claim 12 further comprising the step of providing a user perceptible indication of which battery is being charged.

* * * * *